Feb. 13, 1962  E. R. KENNEDY  3,020,631
METHOD OF MAKING HOSE CLAMPS
Filed Oct. 2, 1958

INVENTOR.
EDWARD R. KENNEDY
BY Justin C. Macklin
ATTORNEY

United States Patent Office 3,020,631
Patented Feb. 13, 1962

3,020,631
METHOD OF MAKING HOSE CLAMPS
Edward R. Kennedy, Seven Hills, Ohio, assignor, by mesne assignments, to Republic Industrial Corporation, New York, N.Y., a corporation of Delaware
Filed Oct. 2, 1958, Ser. No. 764,973
3 Claims. (Cl. 29—417)

The present invention relates to a method of making a hose clamp in the form of a flat band ring adapted to tightly embrace the hose and exert a circumferential and inwardly radial pressure, holding the hose tightly onto a rigid tube member or nipple for substantially permanent connection.

It further relates to the method of economically manufacturing such a hose clamp from a continuous strip in high production on forming devices, commonly referred to as a four-slide machine, functioning to actuate several dies in timed relation.

The principal object of the method is to make a simple, efficient structure which shall be capable of very firmly holding a hose onto its rigid tubular connecting element with sufficient force to withstand pressures, within the hose and connection, of upwards of one hundred or even two hundred pounds or more pressure per square inch.

In addition to so designing such a hose clamp that it may be efficiently manufactured, an object is to provide for convenient application to the hose and effecting the clamping action with pliers of the "nipper" type in common use, effecting a circumferential contraction and giving a permanent set to a protuberance in the band, while so reducing its circumferential length and diameter.

A more specific object of the invention is the provision of a simple, economical and highly efficient mechanical connection between the ends of the band to form the permanently closed annulus.

Another specific object is to arrange for most convenient removal of the band, when desired, by a simple tool, such as a chisel, screw driver, or cutting pliers or shears.

It has heretofore been proposed to make such clamps of a unitary structure with two or more upwardly extending loops which may be compressed by engaging the loop at its juncture with the circular formation of the band. Attempts to make such bands of continuous strips have encountered mechanical difficulties in the formation thereof and in the providing of a simple, effective and permanent lock between the ends of the strip forming the ring or annulus.

In carrying out my invention, we proposed to use a flat metal band (sometimes referred to as flat wire), fed from a coil to forming dies operated by a suitable mechanism after the manner of well known four-way slide formation of many types of strip and wire articles. Thus, the production may be substantially continuous with intermittent feed from the storage coil of a flat band, completing the formation of the ring with its offset loop or protuberance and effecting the permanent locking between the ends of the strip forming the ring clamp.

The accompanying drawings illustrate illustrative steps of formation and application of the hose clamp according to a preferred and efficient method of making the same and applying it to the hose connection.

Figure 3:
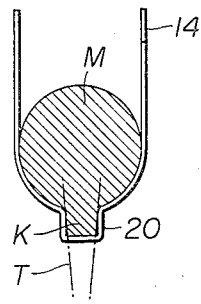
Figure 4:
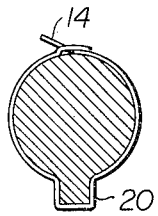
Figure 5:
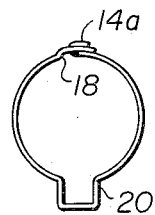
Figure 6:
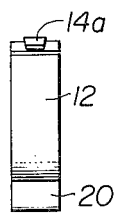

FIG. 3 indicates a preliminary step in the formation about a mandrel provided with an offset key-shaped element to form a loop in the band;

FIG. 4 shows the band being closed preparatory to final locking;

FIG. 5 is a similar view showing the completion of the locking engagement;

FIG. 6 is a side elevation of the completed locked clamp shown in FIG. 5; and

Figure 7:
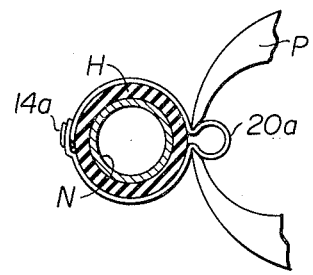

FIG. 7 illustrates the band being tightened upon the hose by pinching the sides of the loop with a suitable form of pliers.

Figure 1:
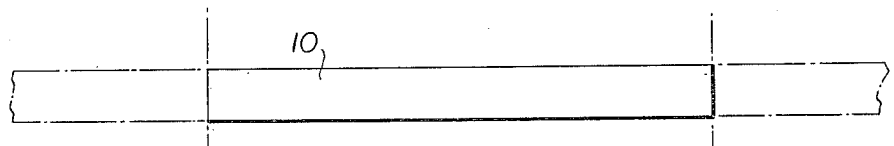
FIG. 1 is an illustration of a continuous flat strip from which blanks or sections are to be severed.
Figure 2:
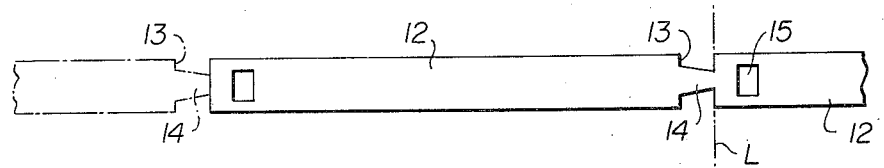
FIG. 2 is a view showing the forming of the locking means prior to the severing of the strip from a feeding coil.

Referring to the drawings by the use of reference numerals, 10 indicates the band being fed from a storage coil, the length of a blank section being shown in solid lines. In FIG. 2, 12 indicates the blank from which the annulus is to be formed. As the band is fed to the forming dies, it is notched, as at 13, to form a tongue portion 14 which is permitted, in this step, to remain joined with the preceding portion 12. At the same time of forming the notches, a rectangular opening 15 is punched in the adjacent end of the preceding blank section 12. The tongue 14 is later to be thrust through the opening 15 for the permanent locking of the band in the closed annulus.

As indicated, the right hand end of FIG. 2 shows the notches 13 and tongue shape 14 as remaining connected with the preceding blank. The rectangular opening 15, which is preferably simultaneously formed, is shown on the preceding blank. At the left hand end of FIG. 2, for convenience of illustration, a corresponding opening 15 is shown as there located, although normally it will not be formed until that end of the blank portion 12 is presented to the position of the notching dies. Thus, however, the portion 12 indicates the blank which will be next presented to a forming mandrel to be shaped as indicated in FIG. 3.

The band is continued to be fed until its intermediate portion is brought into engagement with a mandrel M, and the tongue 14 is severed from the preceding blank along a line indicated by the broken line L in FIG. 2. The mandrel M is provided with a key-shaped portion, which is preferably shaped substantially as shown, with either parallel sides or sides slightly converging outwardly from the mandrel. This key portion is indicated at K and may extend a radial distance sufficient that, as will later appear, the offset in the band shaped by it may be formed into a somewhat circular convex loop.

On FIG. 3 are indicated broken lines T by way of suggesting the slope of tapered sides of the key and loop formed thereon. As coacting die members move toward the mandrel, the band is pressed into the shape there indicated, leaving the end portions extending beyond. The ends are now moved inwardly by a suitable motion of additional coacting dies, causing the tongue 14 to pass through the opening 15, and while so held, the tongue is bent backwardly upon itself toward the adjacent end of the strip through which it thus passes, and is tightly crimped or pressed into the locking position shown at 14a in FIG. 5. In this pressing or clamping movement the portion of the band through which the tongue pasess is offset, as at 18, to bring the adjacent end into a circular form for more complete circular contact with the hose to be clamped.

The width of the band may be any desired width, but if made of rolled steel or like metal suitable for taking a set and adapted for clamping the hose having approximately a one-inch outside diameter, for example, it may be fifteen to thirty-thousandths of an inch thick and one-fourth to three-eighths of an inch wide. The metal used is preferably of a nature which when given a set, as with the locking of the tongue 14, as described, and when crimping or re-forming the inner portion of the offset loop 20, the formation given is retained against very substantial strain.

Assuming that the end of a hose H has been fitted over a nozzle or tube end N with the finished hose clamp of FIGS. 5 and 6 in position thereon, a suitable tool, such as a pair of pliers with matching edges, is applied to the loop to tighten the clamp onto the hose and thus onto the nipple, while re-shaping the loop 20 substantially to the form shown in 20a. The resilience of the material, coupled with the permanent set thus given to it, will firmly hold the hose in such tight engagement as to withstand high internal pressures at the connection thus being clamped.

For removal, a simple tool, such as a chisel or screw driver, may be used to pry up and straighten the closed tongue 14a, and the ends may be separated and the rings spread the necessary amount. Likewise, obviously the loop may be cut, if desired, with any suitable cutting tool.

It is recognized that hose clamps have been made in the form of a unitary annulus which is difficult to manufacture, a special formed tube having been proposed from which short lengths are cut to form the individual ring clamps with a number of loops previously formed in the tube wall. Also, it has been attempted to form such a ring by closing the end by welding—either butt welding or overlapping and spot welding. This, however, is now more expensive.

Having thus described my invention, what I claim is:

1. A method of forming a hose clamp from a continuous flat strip of strong resilient metal, comprising the steps of progressively feeding the strip to forming dies, notching both edges of the strip to shape the sides of a tapered tongue while leaving the narrower end of the tongue connected to the leading portion of the strip, punching an angular tongue-receiving opening in the strip, said opening having a transverse straight edge closely adjacent to the juncture with the tongue and of a width to permit the insertion of the tongue, severing the end of the tongue transversely from its joining strip portion, pressing the intermediate portion of the strip against a round mandrel having a protuberance thereon shaped to form an offset loop in the strip and having substantially straight separated sides, curving the end portions around the mandrel and into overlapping engagement with the tongue projecting through said opening, bending the tongue backwardly over the adjacent ends of the strip for permanent locking engagement, and then forming an offset of the strip at each side of the opening and inwardly for a distance equal to the thickness of the strip to bring the adjacent ends of the strip into a circular form of substantially complete circular contact with a hose to be clamped.

2. The method defined in claim 1, in which the notches forming the sides of the tapered tongue terminate at transverse shoulders on the strip at each side of the tongue, and in which the length of the tongue is sufficient to overlap the portion of the strip between its straight transverse tongue-engaged edge between the edge and the transversely severed end of the strip.

3. The method defined in claim 1, including completing the application of the clamp to a hose and tightening it around the same by compressing the sides of the offset loop formed by said protuberance on the mandrel, the tightening being effected by forcible engagement of the loop at the transverse juncture corners between the loop and the two adjacent curved portions of the ring.

References Cited in the file of this patent

UNITED STATES PATENTS

| | | |
|---|---|---|
| 337,019 | Schussler et al. | Mar. 2, 1886 |
| 470,985 | Clarke | Mar. 15, 1892 |
| 2,004,138 | Story et al. | June 11, 1935 |
| 2,614,304 | Oetiker | Oct. 21, 1952 |
| 2,697,274 | Merrill | Dec. 21, 1954 |
| 2,762,117 | Houck | Sept. 11, 1956 |
| 2,762,118 | Shaw | Sept. 11, 1956 |